United States Patent [19]
Langberg

[11] Patent Number: 5,732,112
[45] Date of Patent: Mar. 24, 1998

[54] CHANNEL TRAINING OF MULTI-CHANNEL RECEIVER SYSTEM

[75] Inventor: Ehud Langberg, Ocean, N.J.

[73] Assignee: Globespan Technologies, Inc., Red Bank, N.J.

[21] Appl. No.: 579,713

[22] Filed: Dec. 28, 1995

[51] Int. Cl.[6] .............................. H04B 1/10; H04L 27/01
[52] U.S. Cl. .................... 375/349; 375/233; 375/234
[58] Field of Search ......................... 375/231, 233–235, 375/260, 267, 299, 346–349; 455/69–70, 101, 277.1, 278.1

[56] References Cited

U.S. PATENT DOCUMENTS

| | | | |
|---|---|---|---|
| 4,761,796 | 8/1988 | Dunn | 375/202 |
| 4,847,869 | 7/1989 | Labedz et al. | 375/349 X |
| 5,163,066 | 11/1992 | Cupo et al. | 375/349 X |
| 5,375,143 | 12/1994 | Kazecki et al. | 375/349 X |
| 5,398,259 | 3/1995 | Tsujimoto | 375/233 |
| 5,502,506 | 3/1996 | Choi | 375/233 X |
| 5,513,216 | 4/1996 | Gadot et al. | 375/233 |

FOREIGN PATENT DOCUMENTS

000428129  5/1991  European Pat. Off. ............... 375/349

*Primary Examiner*—Young T. Tse
*Attorney, Agent, or Firm*—Thomas, Kayden, Horstemeyer & Risley

[57] ABSTRACT

In a multi-channel receiver system embodying the invention, a "trained" receiver channel which is active and propagating data signals may be used to train any other receiver channel. Each receiver channel of the system has an input and an output, with each input for receiving a different portion of an original data signal. Each receiver channel includes adaptive filter coupled between its input and its output for propagating the signals received at its input to its output. In accordance with the invention, a first trained receiver channel is used to train a second receiver channel by coupling the output of the first receiver channel to the output of the second receiver channel for training the adaptive filter of the second receiver channel. The training of the second receiver is completed by transmitting the same data signal to the first and second receiver channels.

15 Claims, 5 Drawing Sheets

CHANNEL TRAINING OF MULTI-CHANNEL RECEIVER SYSTEM

BACKGROUND OF THE INVENTION

This invention relates to data communications systems and, in particular, to a system for receiving different portions of a transmitted data signal on different channels and recombining the different portions to reconstitute the original data signal.

For example, in a high bit rate digital subscriber line (HDSL) system, it is desirable to divide the high rate data stream to be transmitted into two portions to enable a higher effective transmission rate. An original single data stream to be transmitted is first divided into two portions at the transmitter. Then, the transmitter transmits one portion via one transmission channel (e.g., channel A) and transmits the other portion via a second transmission channel (e.g, channel B). As used herein, a "transmission channel" or a "communication channel" is defined as the path or loop from a transmitter to its receiver. However, the two different transmitted portions of the signal received by the receiver must be recombined at the receiver. Recombining the two received portions to reconstitute the original high rate data stream signal is problematic because the characteristic of the two transmission channels may be significantly different. That is, the two channels may be subjected to different degrees and levels of distortion, where the distortion includes different propagation delays, different phase shifts, and different amounts of noise.

In particular, since the data received on one channel may be delayed with respect to the data received on the other channel, the two different data portions received by the two receiver channels must be aligned and synchronized to be properly recombined into a single high rate data stream which corresponds to the original single data stream.

For ease of illustration, assume an HDSL system having two receiver channels and that one portion of the data signal is transmitted via a transmission channel A to a corresponding "receiver channel A" and another, different, portion of the data signal is transmitted via a transmission channel B to a corresponding "receiver channel B". The term "receiver channel", as used herein, refers to the portion of a receiver channel extending from its input terminal, at which it receives transmitted signals, to the output of its equalizer network, which output is then fed to a merging circuit for combining the various channels of the receiver. Each receiver includes circuitry to process received data signals in order to align and synchronize the two different data portions relative to each other so they can be recombined to reconstitute the original single data stream. The processing and adjustment of a receiver channel to compensate for transmission channel distortion and to align it to another channel of a receiver is generally referred to herein and in the appended claims as the "training" of the receiver channel. Thus, in establishing communication between a transmitter and its associated receiver there is first a "start-up" or "training" phase followed by a "communication" or "actual data transmission" phase. A presently known technique for training a dual channel HDSL system includes means for applying a special training sequence to both receiver channels simultaneously during a start up period. The sequence includes an accurate "time-stamp" and training signals for "adjusting" the receiver channels and the transmitter sequences. Once the two receiver channels are trained, customer data is transmitted from the transmitter to the two receiver channels.

Subsequent to being "trained", if any channel fails, it must be "retrained" before being restored to service. A problem with the existing training schemes is that if one of two channels fails, both channels (i.e., the failed channel and the still operative channel) must be "taken down" and the two channels retrained before full recovery of the transmitter-receiver can be established. This is disadvantageous in that it interrupts the operation of an operative channel and slows down the operation of the system due to the need to retrain both channels.

SUMMARY OF THE INVENTION

In a multi-channel receiver system embodying the invention, a "trained" receiver channel may be used to train any other receiver channel. In accordance with the invention, the trained receiver channel may continue operating and propagating data signals while it is used to train another receiver channel which is being placed in, or restored to, service. This avoids the need to disrupt an operative receiver channel, as in the prior art, when another channel is being trained. Also, using an already trained and operative receiver channel to train another receiver channel, shortens the required training time since the training sequence is simpler than in the prior art (e.g., it may not require a "time-stamp" sequence).

A receiver embodying the invention includes at least two receiving channels, with each receiving channel having an input and an output, with each input for receiving a different portion of an original data signal. The outputs of the receiving channels are connected to a merging circuit for combining the different portions of the received data signal and reconstituting the original data signal. Each receiving channel includes an adaptive filter means coupled between its input and its output for propagating the signals received at its input to its output. Each adaptive filter means is adjustable to compensate for distortions and delays along its associated transmission channel. In accordance with the invention, a first already "trained" receiver channel may be used to train a second receiver channel by coupling the output of the first receiver channel to the second receiver channel for training the adaptive filter means of the second receiver channel. To complete the training of the second receiver channel, the same data signal that is being transmitted to the first receiver channel is transmitted to the input of the second receiver channel.

In one embodiment of the invention, the receiver includes a switching arrangement for coupling an output of a "trained" receiver channel to a receiver channel to be "trained". An associated transmitter includes a switching arrangement for transmitting the same data signals to the trained receiver channel and the receiver channel being trained.

In an embodiment of the invention, each receiver channel includes an adaptive feed-forward filter (FF) and an adaptive feedback filter (FB), with the input of FF being coupled to the input of the receiver channel and the input of FB being connected to the output of the receiver channel. The outputs of FF and FB are supplied to an adder which produces a difference signal applied to the input of a slicer circuit. The output of the slicer circuit is connected to the output of its receiver channel when the receiver channel is in a data transmission phase. When the receiver channel is in a training phase, the slicer output is disconnected from its receiver channel output and instead, a training signal is applied thereto. A first receiver channel which is trained and active (i.e., it is receiving data signals and the output of its slicer circuit is connected to its receiver channel output) may be used to train a second receiver which is placed in the training mode (i.e., it's slicer output is disconnected from its channel output) by connecting the output of the first receiver channel to the output of the second receiver channel. Concurrently, the data being transmitted to the first receiver channel is also transmitted to the second receiver channel.

In a receiver channel embodying the invention, the input to the slicer circuit and the receiver channel output are applied to: an adder to produce an error signal which is applied to: (a) a first multiplier whose output is used to adapt the feed-forward (FF) filter; and (b) a second multiplier whose output is used to adapt the feedback (FB) filter.

BRIEF DESCRIPTION OF THE DRAWINGS

In the accompanying figures like reference characters denote like components.

DETAILED DESCRIPTION OF THE INVENTION

Figure 1A:
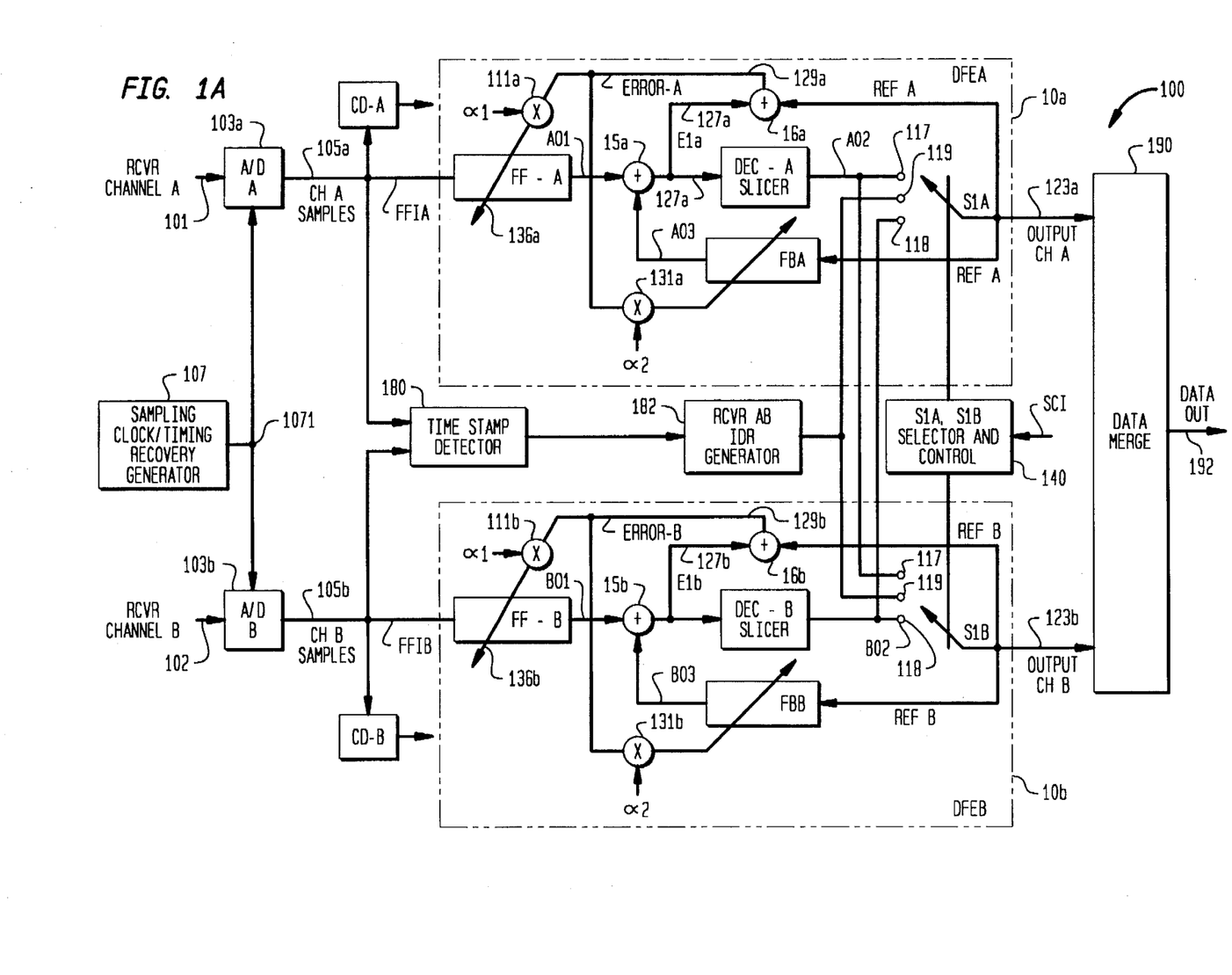
FIG. 1A is a block diagram of part of a receiver system embodying the invention.
Figure 1B:
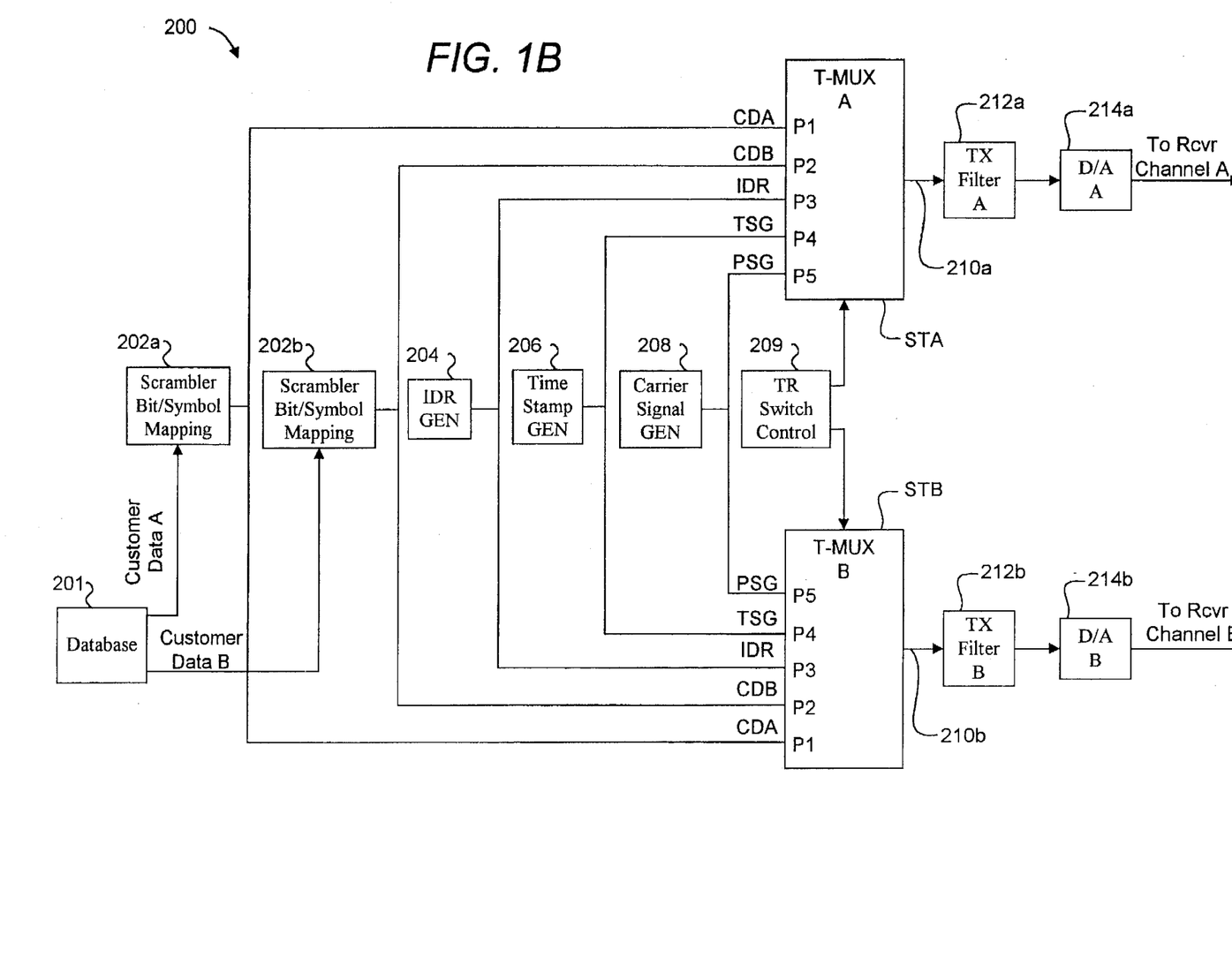
FIG. 1B is a block diagram of a transmitter embodying the invention.

FIG. 1A shows portion of a dual-duplex receiver 100 embodying the invention adapted for use in an illustrative dual-duplex system, and FIG. 1B shows a transmitter embodying the invention for use with receiver 100. In FIG. 1A, receiver channel A data is received on lead 101 and channel B data is received on lead 102. The signals on leads 101 and 102 are respectively coupled through analog-to-digital (A/D) converters 103a and 103b to form input samples A and B on leads 105a and 105b, respectively. Each one of the A/D converters 103a and 103b is strobed by a common sampling clock signal supplied on line 1071 by a timing recovery generator 107. Timing generator 107, which may include a master clock source and a timing recovery circuit, provides the same sampling clock signals to A/D 103a, 103b and to receiver channels A and B. The rate of the sampling clock signals supplied to A/D converters 103a and 103b causes each of these converters to generate line samples at n/T samples per second, where n is a predetermined integer equal to or greater than one. The channel A input signal samples on line 105a are applied to a time stamp detector 180, a carrier detector CDA, and the input (FFIA) of its associated adaptive filter 10a. The channel B input signal samples on line 105b are applied to time stamp detector 180, a carrier detector CDB, and the input (FFIB) of its associated adaptive filter 10b.

As is known in the art, to varying degrees, inter-symbol interference (ISI) is always present in a data communications system. ISI is the result of the transmission characteristics of the communications channel, i.e., the "channel response," and, generally speaking, causes neighboring data symbols, in a transmission sequence, to spread out and interfere with one another.

In FIG. 1A, each one of the adaptive filters 10a, 10b is configured, during data transmission, to form an adaptive decision-feedback equalizer (DFE) which functions to remove ISI in the receiver. Each one of filters 10a and 10b includes an adaptive feed-forward filter section (FFA, FFB), a decision circuit (DECA, DECB), an adaptive feedback filter section (FBA, FBB), a first adder (15a, 15b) and a second adder (16a, 16b).

Each feed-forward filter receives and processes n inputs for each symbol interval; whereby each equalizer may be referred to as a fractionally-spaced equalizer and more specifically as a T/n type of fractionally spaced equalizer since each receives and processes n samples per symbol interval. The outputs of filters FFA and FFB are generated once per symbol interval and are respectively coupled through decision circuits DECA and DECB.

Each one of decision circuits DECA and DECB may be any one of a number of "slicer" circuits which functions to quantize its coupled equalizer output to the closest one of a plurality of permissible transmitted signal levels. Accordingly, the decisions circuits (DECA and DECB) are also referred to herein and in the appended claims as slicers.

Each of the feed-forward (FFA, FFB) and feedback (FBA, FBB) filters tends to remove a portion of the ISI. Each of these filters includes a plurality of adjustable coefficients to compensate for the distortions in transmission channels A and B, respectively. Since the distortion in the transmission channels varies with time, these filters are preferably of the automatic or adaptive variety and their coefficients have values which may be varied.

The output (AO1, BO1) of each feed-forward filter is applied to one input of its associated first adder (15a, 15b). The output (AO3 and BO3) of each feedback filter (FBA, FBB) is applied to a second input of its associated first adder circuit (15a, 15b). The output (E1a, E1b) of each first adder (15a, 15b) is applied to the input of a corresponding decision circuit (DECA, DECB) and to an input of a corresponding second adder (16a, 16b).

In receiver channel A, the output (AO2) of decision circuit DECA is connected to a terminal 117. A second input of adder 16a and the input to feedback filter FBA are connected to the wiper arm of a switch S1A. In receiver channel B, the output (BO2) of decision circuit DECB is connected to a terminal 118. A second input of adder 16b and the input to feedback filter FBB are connected to the wiper arm of a switch S1B.

Output lines 117, 118 and 119 are selectively coupled via switch S1A to line 123a and via line 123a to the second input of adder 16a and to the input of FBA. Similarly, output lines 117, 118 and 119 are selectively coupled via switch S1B to line 123b and via line 123b to the second input of adder 16b and to the input of FBB. Switches S1A and S1B are switched to their various positions (lines 117, 118, 119) by means of a control circuit 140 which, in turn, is responsive to a control signal SCI generated by a controller (e.g. a microprocessor or other controlling agency, which is not shown) of the receiver. The signal SCI determines the interconnections and configurations of the receiver channels during various operating phases.

Figure 4:
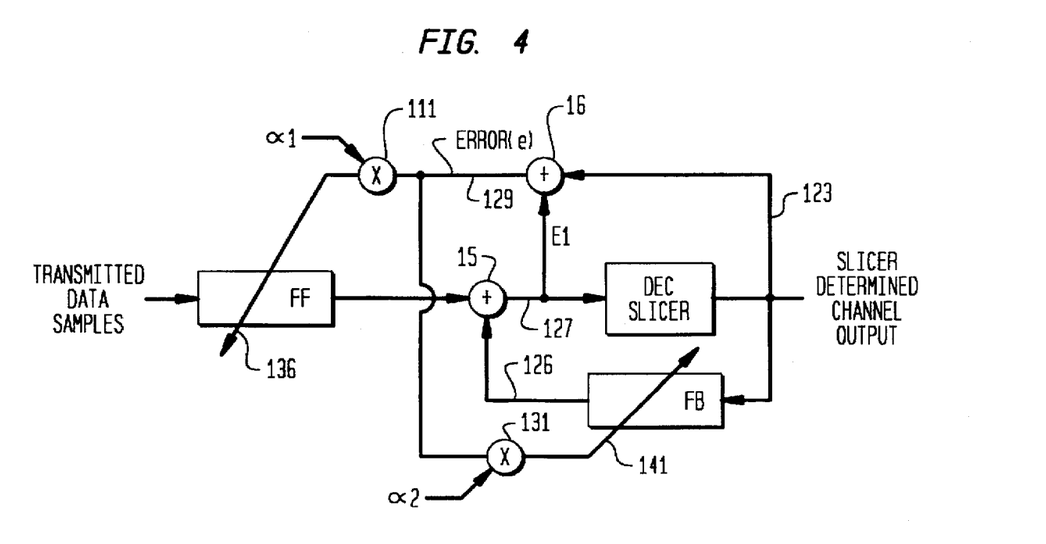
FIG. 4 is a block diagram of a portion of the adaptive equalizer of a receiver channel as configured during customer-data transmission.

With respect to channel A, when its customer-data is being processed, switch S1A is connected to terminal 117 and the slicer output of DECA is applied to the second input of adder 16a and to the input of FBA. With respect to channel B, when its customer-data is being processed, switch S1B is connected to terminal 118 and the slicer output of DECB is applied to the second input of adder 16b and to the input of FBB. During customer data transmission, each equalizer 10a, 10b is configured as shown in FIG. 4.

Figure 3:
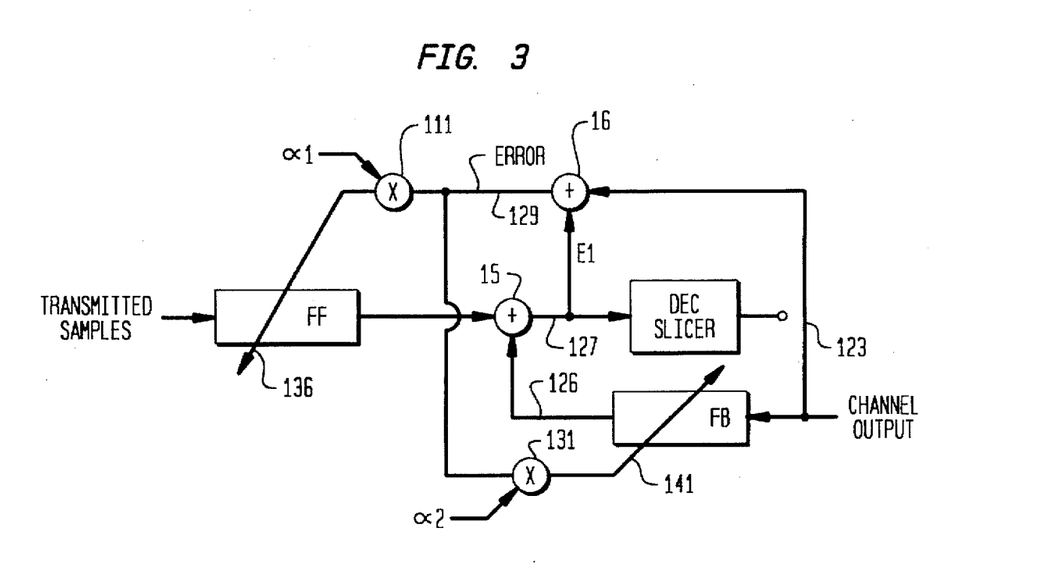
FIG. 3 is a block diagram of a portion of the adaptive equalizer of a receiver channel as configured during training.

When channels A and B are being trained using ideal reference generator 182, switches S1A and S1B are connected to line 119. The resulting configuration of equalizers 10a, 10b during a training phase is shown in FIG. 3.

Figure 2:
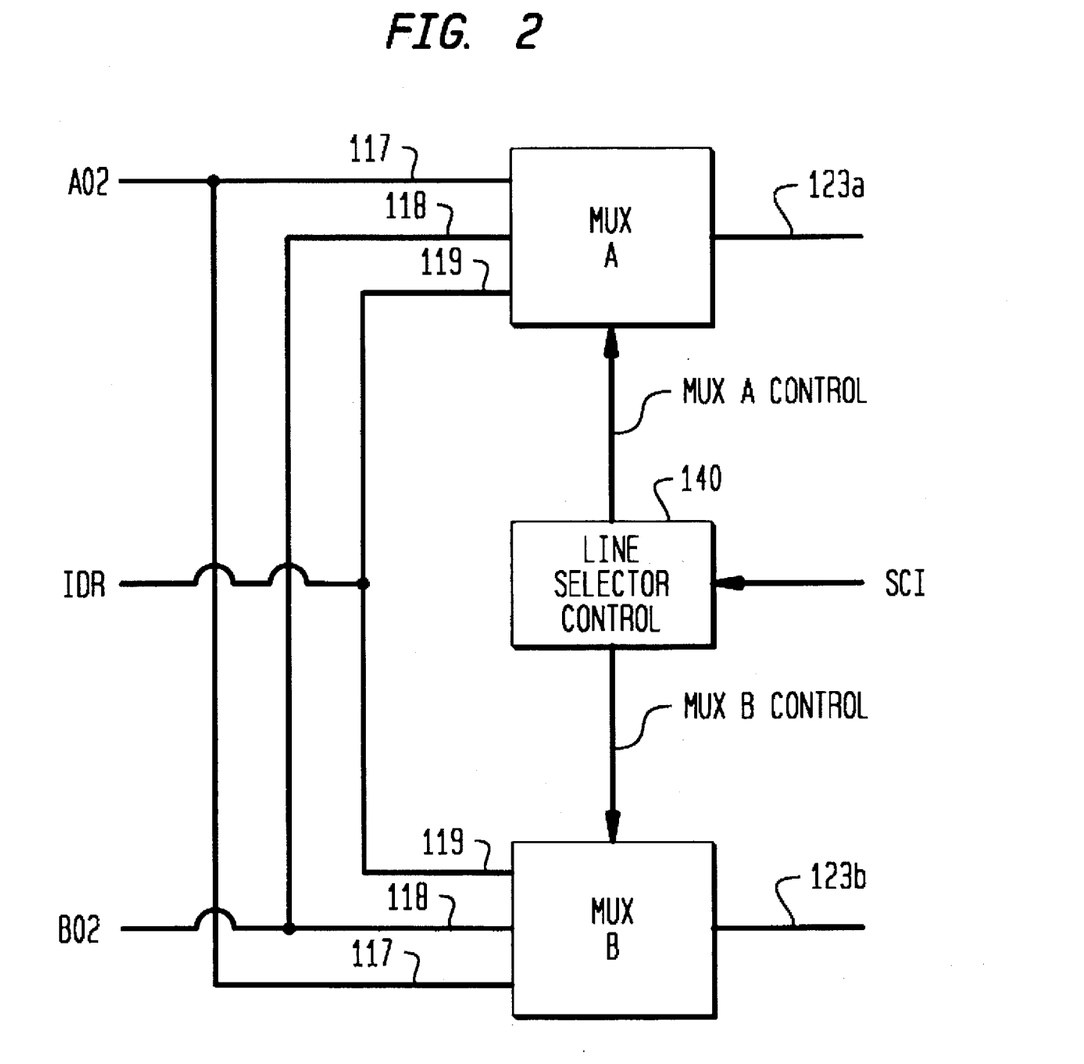
FIG. 2 is a block diagram of a multiplexing arrangement for coupling signals to, and between, the two receiver channels.
Figure 5:
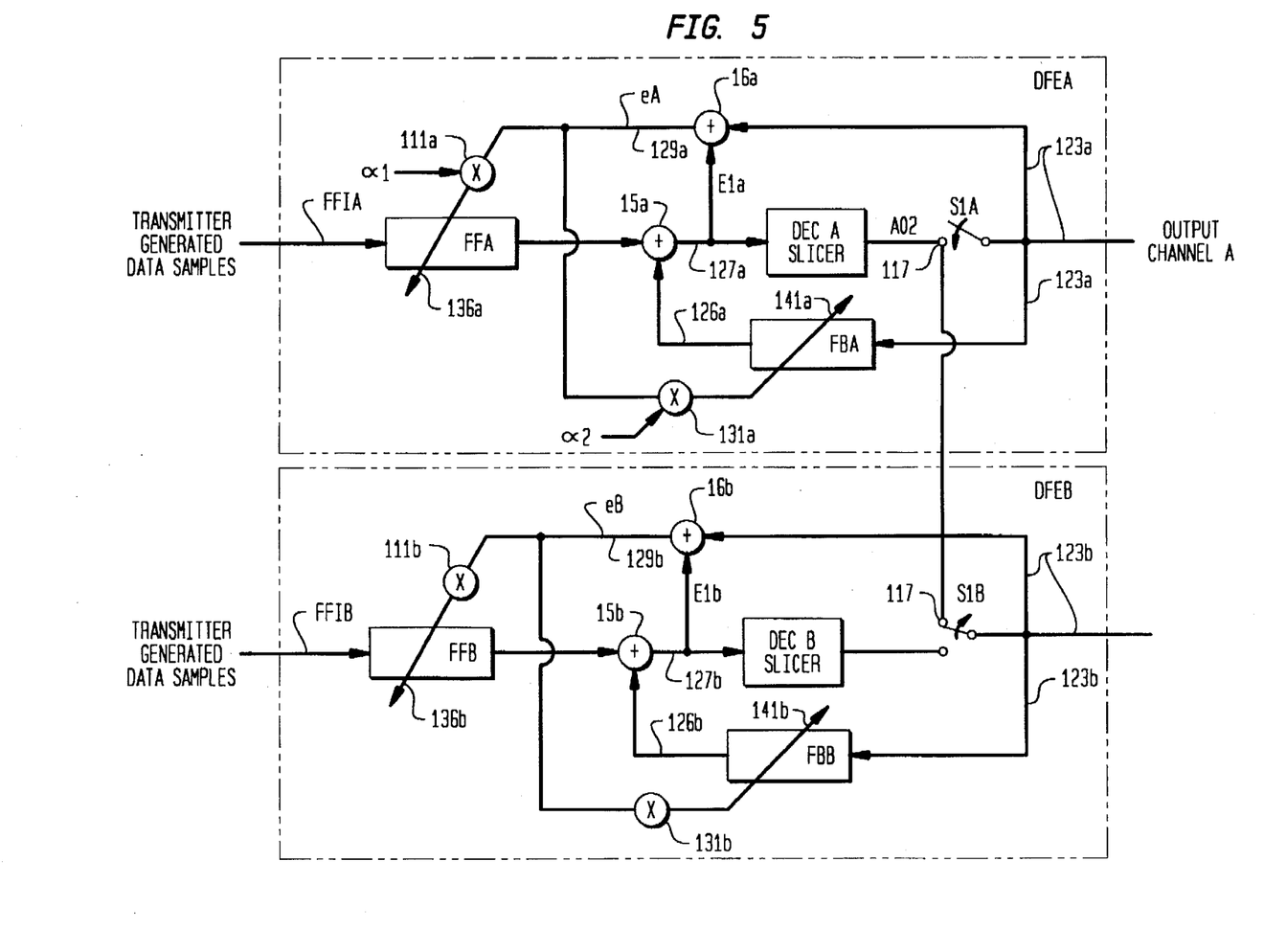
FIG. 5 is a block diagram of an adaptive filter of one receiver channel being trained by another receiver channel in accordance with the invention.

As discussed below, in accordance with the invention, when channel A is being trained using channel B, switch S1A is connected to line 118 and when channel B is being trained using channel A, switch S1B is connected to line 117. The resulting configuration of an equalizer of one receiver channel (e.g., B) being trained by another receiver channel (e.g., A) is shown in FIG. 5. Switches S1A and S1B may be implemented using multiplexing gates or any appropriate logical gate arrangements to provide the required switching function. A typical implementation is shown in FIG. 2 where S1A and S1B are shown to be implemented by means of a three input multiplexer (MUXA, MUXB).

Referring to FIG. 1A, adder 16a functions to subtract the signal (REFA) on lead 123a from the output (E1a) of comparator 15a on lead 127a to produce an error-A (eA) signal on lead 129a. The error-A signal is used to adapt (i.e., update and adjust the coefficients) filters FFA and FBA. In a similar fashion, adder 16b functions to subtract the signal (REFB) on lead 123b from the output (E1B) on lead 127b to produce the error-B (eB) signal on lead 129b. The error-B signal is used to adapt (i.e., update and adjust the coefficients) filters FFB and FBB.

In FIG. 1A, the error signal eA is applied to a multiplier 111a, and the resultant signal provided on line 136a is used to adapt FFA. The error signal eB is applied to multiplier 111b, and the resultant signal provided on line 136b is used to adapt FFB. Multipliers 111a and 111b, and 131a and 131b, multiply their respective error signals by a constant or step size ($\alpha1$, $\alpha2$). It is normally preferable to speed up the "training" of the adaptive filters. This entails using large steps which provide higher speed but at the expense of accuracy. During data transmission, it is normally preferable to use smaller steps, providing greater accuracy, but with decreased speed. Accordingly during a training phase, the step size of $\alpha1$ and $\alpha2$ are chosen so that the circuit responds more quickly (but less accurately) to adjust the coefficients of the feed-forward and feedback filters FFA, FFB, FBA and FBB. During the customer data transmission phase of operation, the step size of $\alpha1$ and $\alpha2$ are chosen to provide smaller steps so that the speed of response is decreased; but the accuracy is increased to drive error levels towards zero.

Time stamp related sampled signals on lines 105a, 105b are supplied to time-stamp detector 180 which, when detected, supplies a START signal to ideal reference (IDR) generator 182, which initiates a training sequence. In response to the START signal, IDR generator 182 generates IDR signals on line 119 which are used in the training of adaptive equalizers 10a and 10b. The START signal also functions to cause IDR generator to start its operation coincident with the generation and transmission by transmitter 200 of an IDR signal. IDR generator 182 may be a pseudo random symbol generator which functions to produce a signal sequence (referred to as "ideal") which is similar to a signal sequence generated by the transmitter. The transmitted IDR signals and the receiver generated IDR signals are supplied to the receiver channels to train the coefficients of the adaptive equalizers during a standard training cycle.

The data outputs on lines 123a and 123b generated by DECA and DECB, respectively, are supplied to a data merge circuit 190 which functions to combine their outputs and to reconstruct on line 192 the original digital data as it existed prior to its division and transmission via the two transmission channels.

Referring to FIG. 1B, the transmitter 200 includes a data base 201 for generating a high speed digital data bit stream (which may be comprised of baseband or passband signals) at some predetermined rate and dividing the stream into two portions; portion "A" or customer data-A and portion "B" or customer data-B. Portions A and B are supplied to respective circuits 202a, 202b which function to scramble the data, convert it into symbols and map it.

The output of circuits 202a which forms customer-A data (CDA) to be transmitted to the receiver is supplied to a terminal p1 of transmission switches STA and STB. In a similar manner, the output of circuit 202b which forms the customer-B data (CDB) is supplied to a terminal p2 of switches STA and STB. An idealized reference generator 204 generates a reference signal which is supplied to terminal p3 of switches STA and STB. A time stamp generator 206 produces a time stamp signal supplied to terminals p4 of switches STA and STB. Also, a carrier signal generator 208 supplies carrier indicator signals PSG to terminals p5 of switches STA and STB.

Switches STA and STB may be any one of a number of logic gates or multiplexers suitable to select any one of the signals present at their p1 through p5 portion. Each one of switches STA and STB is shown to have an output line (210a, 210b) which is selectively coupled to (and makes contact to) any one of its corresponding p1 through p5 input terminals. STA and STB are controlled by means of transmitter switch control circuit 209 which determines which one of the input terminals gets connected to the output (210a, 210b) of the switches. The output (210a, 210b) of each switch STA, STB is then connected to a transmitter filter (212a, 212b) and the output of each transmitter filter is then supplied to a digital-to-analog converter (D/A) 214a, 214b. The output of D/A 214a is transmitted via transmission channel A to receiver channel A and the output of D/A 214b is transmitted via transmission-channel B to receiver channel B. The transmission channels A and B linking the transmitter 200 to receiver 100 may be any known type of loop or link used to transmit data.

Each of transmission channels A and B is typically bidirectional but, for purpose of simplicity, the description which follows only discusses signal processing in one transmission direction. Each of the transmission channels has an associated signal propagation delay and phase shift which is generally different from that of the other channel and which may vary with time.

It should be understood that the present invention is applicable to transmission systems using any of a number of suitable modulation schemes as well as to baseband systems and can be used in systems using virtually any baud or bit rate.

The signal transmitted through each transmission channel represents a succession of data symbols transmitted at a rate of 1/T symbols per second.

The transmitter shown in FIG. 1B is assumed to be located in a central office (CO), and the receiver shown in FIG. 1A is assumed to be located in a customer's premises (CP) or in any location remote from the transmitter. Communication between transmitter and receiver is initiated by setting transmitter switches STA and STB to their position p5 and sending a carrier signal CSG (which may be, for example, a pseudo-random special signal sequence) from the carrier signal generator 208 of the transmitter over channels A and B to receiver channels A and B. The carrier signal is detected at the receiver by carrier detectors CDA and CDB. Upon detection of the carrier signals, the carrier detectors CDA and CDB send signals back to the transmitter indicating that receiver channels A and B are ready and a connection is then made ("handshaking" occurs) between the transmitter and the receiver. Following the establishment of the connection between the transmitter and receiver, signals are transmitted between them for establishing timing recovery and appropriate signal level amplitude via AGC and timing circuitry (not shown).

Then, the training of the receiver channels is instituted to compensate for "distortion" (i.e., differences in propagation delay, phase shifts and noise) in the transmission channels. Switches STA and STB are set to their position p4, and a time stamp signal produced by transmitter time stamp generator 206 is transmitted over transmission channels A and B to receiver channels A and B. When receiver time stamp detector 180 senses the receipt of the time stamp signal, it produces a START signal which is applied to receiver IDR generator 182.

Concurrent with the generation of the START signal, receiver switches S1A and S1B are set to make contact to lead 119 in order to couple the IDR signals generated by receiver IDR generator 182 to adders 16a, 16b and feedback filters FBA, FBB.

Concurrent with the generation of the START signal at the receiver IDR generator 182, transmitter switches STA and STB are set to enable transmission of an IDR signal symbol sequence generated by IDR generator 204, via transmission channels A and B to receiver channels A and B. The intent of the START signal is to cause IDR generator 182 to generate a symbol sequence which is intended to be nearly identical to the symbol sequence being transmitted by IDR generator 204 and for both to occur at nearly the same time. Therefore, a similar signal sequence is being transmitted to channels A and B as is being generated in the receiver and applied to the adders 16a, 16b and the feedback filters.

The transmitted IDR symbols received at the receiver channel A input are coupled via A/D converter 103a and FFA to adder 15a and the transmitted IDR symbols received at the receiver channel B input are coupled via A/D converter 103b and FFB to adder 15b. At the same time, the receiver generated IDR signals are coupled via switch S1A and line 123a to adder 16a and feedback filter FBA and via switch S1B and line 113b to adder 16b and feedback filter FBB. The transmitted IDR signals are applied to the inputs of FFA and FFB and the receiver generated IDR signals are applied to the input of FBA and FBB and to an input of adders 16a and 16b. The configuration of equalizers 10a and 10b for this condition is as shown in FIG. 3. With respect to receiver channel A, the transmitted IDR signals received at the input of receiver channel A and the output of FBA responsive to the receiver generated IDR signals are applied to first adder 15a, to generate a first difference signal (E1a). E1a and the receiver generated IDR signals are then applied to adder 16a to produce an error-A (eA) signal. The eA signal is used to update and adjust the coefficients of feed-forward and feed-back filters FFA and FBA to compensate for the distortion of transmission channel A. Likewise, in receiver channel B, the transmitted IDR signals received at the input of receiver channel B and the output of FBB responsive to the receiver generated IDR signals are applied to adder 15b to produce a difference signal E1b. E1b and the receiver generated IDR signals are then applied to adder 16b to produce an error-B (eB) signal. The eB signal is used to update and adjust the coefficients of FFB and FBB to compensate for the distortion of transmission channel B. Thus, the transmitted and receiver generated IDR signals are used to "train" the system. By transmitting known signal sequences to receivers A and B and by comparing "known" transmitter signals to similar ("ideal") signal sequences generated by the receiver, the coefficients of the adaptive filters FFA, FFB, FBA and FBB are updated so as to compensate for the distortion and impairments in the two different transmission channels. Note that during the training period the step size of multipliers 111 and 131 may be made larger or smaller to increase or decrease the speed of updating the filter coefficients, but with decreasing accuracy for increasing speed.

After an agreed upon period of time has elapsed, the "training" of the adaptive filters 10a, 10b is assumed to be completed and the system is ready to transmit and to receive customer data and actual data transmission begins. [Alternatively, the level of the error-A and error-B signals may be monitored and when the error level is below some value, training is deemed completed.]

Once the receiver channels are "trained", switch S1A is connected to lead 117 which functions to connect the slicer output (AO2) of DECA to line 123a and to data merge circuit 190, and also via line 123a to an input of adder 16a and to the input of feedback filter FBA. Likewise, switch S1B is connected to lead 118 which functions to connect the slicer output (BO2) of DECB to line 123b and to data merge circuit 190, and also via line 123b to an input of adder 16b and to the input of feedback filter FBB. The configuration and interconnection of these components is then as shown in FIG. 4 to form an adaptive decision-feedback equalizer (DFE). Following this operation, transmitter switch STA is connected to its position p1 to transmit customer data-A over transmission channel A and switch STB is connected to its position p2 to transmit customer data-B over transmission channel B.

During the data transmission phase, switch S1A is connected to lead 117 and couples the slicer output (AO2) of DECA to line 123a and data switch S1B is connected to lead 118 and couples the slicer output (BO2) of DECB to line 123b. The outputs of the decision circuits (DECA, DECB) on lines 123a and 123b are then supplied to data merge circuit 190 which functions to recombine the two receiver channel outputs into one synchronized and ordered data stream on line 192.

As is evident from the previous description receiver channel A and its adaptive filter 10a is similar to the structure channel B and its adaptive filter 10b. Hence, these respective structures and functions are identified with like reference characters with a prefix or suffix "A" or "a" denoting components and functions of channel A and a prefix "B" or "b" denoting components and functions of channel B.

To better understand the operations of the equalizers (10a, 10b) reference is made to FIG. 4.

In FIG. 4, the output signal from feed-forward filter FF is applied to adder 15 which, theoretically, subtracts the remaining portion of ISI removed by feedback filter FB from the output signal of FF. Adder 15 provides a signal on line 127 which is applied to adder 16 and to slicer DEC. Slicer DEC selects a particular data symbol as a function of the mapping of the signal on line 127 to a point in a predefined constellation of data symbols (not shown). Slicer DEC provides a data symbol every T seconds, where 1/T is the data symbol rate. This data symbol is an estimate of the received symbol and is provided by slicer DEC on line 123 for processing by other receiver circuitry (not shown) to recover the actually transmitted data, in this case the data representative of the training signal.

The output of slicer DEC is also provided to (ISI) feedback filter FB and adder 16. Feedback filter FB predicts the amount of ISI present in the received signal and provides an ISI prediction signal to adder 15, via line 126. Adder 15, as described above, removes the remaining portion of ISI from the received signal by subtracting the ISI prediction signal from the output signal of feed-forward filter FF.

Adder 16 subtracts the estimated data symbol provided by slicer DEC from the ISI-reduced signal present on line 127 to provide an ERROR signal on line 129. The ERROR signal represents the amount of ISI error and channel noise that has not been corrected by the operation of either feed-forward filter FF or feedback filter FB. The ERROR signal is used to adapt both feed-forward filter (FF) and feedback filter (FB) via multipliers 111 and 131. It is assumed that the adaptation algorithms (not shown) of the feed-forward and feedback filters conform to the use of minimum mean square error (MMSE), zero forcing, or its variations, as known in the art. Multiplier 111 multiplies the ERROR signal by a constant or step size, α1. The resulting signal provided on line 136 is used to adapt feed-forward filter FF. Further, the ERROR signal on line 129 is provided to multiplier 131, which effectively multiplies the ERROR signal by the step size α2. The resulting signal provided on line 141 is used to adapt feedback filter FB.

In the prior art systems, if one of the two transmission channels fails for any reason (e.g., break in a line, or excessive noise), upon resumption of operation of the failed channel, the operation of the continuously active channel is interrupted in order to retrain and realign both channels.

In systems embodying the invention, a continuously active and trained channel may be used to train any other channel or channels, or to retrain a failed channel and restore it to service. The operation of a system in accordance with the invention is explained as follows. Assume, for example, that receiver channel A is trained and operative and that receiver channel A will be used to train receiver channel B, as shown in FIG. 5. In accordance with the teachings of the invention assume that customer data continues to be transmitted to channel A and to be processed via receiver channel A throughout the period of time that receiver channel B is being trained by channel A.

To complete the training of channel B, the transmitter and receiver system are operated and/or function as follows:

The same customer data beings transmitted via transmission channel A is also being transmitted via transmission channel B. That is, transmitter switch STB is set to position p1 whereby the customer data being propagated on channel A is also transmitted via transmission channel B to receiver channel B. Receiver channel A continues operating as before. However, a training and alignment cycle will be conducted for channel B using customer-A data and the slicer-A determined output AO2 of receiver channel A. For the training of channel B, channel A customer-A data is transmitted and received on line 102. Concurrently, switch S1B is connected to lead 117 whereby the slicer output AO2 of the channel A decision circuit DECA is applied to the inputs of feedback filter (FBB) and adder 16b, as shown in FIG. 5. Channel B is also preferably switched to a training mode in which multiplier elements 111b and 131b are set to allow a faster response of the feed-forward and feedback filters of channel B to the "training" signals produced by receiver channel A. The channel A data at the output of DECA thus functions as the reference input signal for 16b and FBB of channel B to adapt (adjust) the coefficients of FFB and FBB.

For the condition of STB and S1B described above, the channel A customer data being transmitted over transmission channel A is also being transmitted over transmission channel B. Channel A data is thus received at 102 and after conversion in A/D 103b is supplied to the input of FFB. The output of FFB is compared to the output of FBB. The output of FFB which is now responsive to the transmitted channel A data is subtracted at the adder 15b from the output of FFB which is driven by data which was equalized and adjusted, as discussed above, and represents transmitted channel A data which has been corrected via the circuitry of channel A. The output E1b of adder 15b is then also compared in adder 16b to AO2 data to produce an error-B signal which is coupled to lines 136b and 141b to update and adjust the coefficients and parameters of FFB and FBB. The coefficients of FFB and FBB are thus set to compensate for distortions in the transmission channel B and any delay in channel A.

The training phase of a receiver channel (e.g., B) by means of another channel (e.g. A) may be assumed to be completed after a preselected period of time has elapsed. Alternatively, the error signal (e.g., B) of the receiver channel being trained may be monitored until the error level is below a predetermined acceptable level.

It should be noted that during a training phase the output of the slicer circuit of a receiver channel being trained is disconnected from its receiver channel output (i.e. line 123). Instead, either: (a) the receiver generated (or based) IDR training signal is applied to the receiver channel output (see FIG. 3); or, (b) the receiver channel output (e.g., AO2) of another active receiver channel (e.g., A) is applied to the output (123b) of the receiver channel (e.g., B) as shown in FIG. 5.

A significant advantage of using an already trained and active receiver channel (e.g., A) whose slicer output is connected to its channel output, to provide the reference signal to train other receiver channel (e.g., AO2 applied to line 123b with slicer B output disconnected from line 123b) is that, in addition to adapting (adjusting) the feed-forward and feedback filters of the other receiver channel (e.g., FFB and FBB) to compensate for distortion in transmission of the other receiver channel (e.g., B) the adaptive filters (FFB, FBB) of the other receiver channel (e.g., B) are compensated for the overall delay in the trained channel (e.g., A). In order to compensate for the delay in channel A, the fractional spaced equalizer (FFB) must have sufficient coefficients and a delay line which is long enough so the filter response position of channel B can be adjusted for the right amount of channel delay. Since the channel A (doing the training) filter response is "centered in its delay line, the feed-forward filter size should be set to accommodate the optimum feed-forward filter (FF) length and the maximum delay difference between the receiver channels.

Once channel B has been realigned and retrained, the receiver switch S1B makes contact to lead 118 (switch S1A remains in contact with lead 117) whereby the output of decision circuit B is now fed back to the input of FBB and to adder 16b. Concurrently, at the transmitter, switch STB is switched to contact position p2 to now send customer-data B signals via transmission channel B.

The use of customer channel A data for aligning channel B is valid since the error for the active channel receiver is low.

Thus, in accordance with the invention, when a transmission channel fails, its corresponding receiver channel can be trained and placed in service using an active trained receiver channel without interrupting its operation. The signal channel training is also much faster than in the prior art scheme since it does not require an ideal reference time stamp or timing recovery training.

The invention has been illustrated using two channel (A,B). However, it should be evident that more than two transmitting channels and more than two receiving channels may be used in systems embodying the invention; i.e., there may be "N" channels where N is an integer greater than one (1).

Also, the invention has been illustrated using a particular type of DFE. It should be evident that any suitable adaptive filter arrangement can be used instead.

What is claimed is:

1. A receiver comprising;

N receiver channels, each receiver channel having an input and an output; where N is an integer greater than 1; each receiver channel being adapted to receive, at its input, a different portion of an original signal to be reconstituted from the various portions;

first coupling means for coupling the outputs of the N receiver channels to a merging circuit for combining the different portions of the received signals and reconstituting the originally transmitted signal;

each one of said N receiver channels including adaptive filter means coupled between the input and the output of its receiver channel and along which the signal is propagated; each adaptive filter means being adjustable to compensate for distortions in the signal received at its receiver channel input;

each receiver channel including switching means for selectively switching its receiver channel to a first, filter adapter, configuration during a training phase and to a second, data processing and propagating, configuration during a data transmission phase; and second coupling means for selectively coupling the output of a receiver channel switched to said second configuration to the output of another receiver channel switched to said first configuration.

2. A receiver as claimed in claim 1, wherein the adaptive filter means of each receiver channel includes an adaptive feed-forward filter, an adaptive feedback filter, a slicer circuit, and first and second adders;

wherein the feed-forward filter has an input coupled to the input of its receiver channel and has an output coupled to an input of the first adder;

wherein the feedback filter has an input coupled to the output of its receiver channel and has an output coupled to another input of the first adder;

wherein the first adder has an output, for producing a difference signal, coupled to a first input, the first input being an input of the slicer circuit and to a second input, the second input being a first input of the second adder;

wherein the output of the receiver channel is coupled to a second input of the second adder; and wherein the output of the slicer circuit of a receiver channel is connected to the output of its receiver channel for forming said second configuration and is disconnected from the output of its receiver channel for forming said first configuration.

3. A receiver as claimed in claim 2 wherein said second adder of each receiver channel produces an error signal which is coupled:

(a) via a first multiplier to the feed-forward filter of its receiver channel to adjust it; and via a second multiplier to the feed-back filter of its receiver channel to adjust it.

4. A receiver as claimed in claim 3, wherein N is equal to two.

5. A receiver as claimed in claim 1 wherein each adaptive filter means is a decision feed-back equalizer (DFE).

6. A receiver as claimed in claim 1 further including third coupling means for selectively coupling to the output of a receiver channel switched to said first configuration a receiver generated training signal.

7. A receiver comprising;

N receiver channels, each receiver channel having an input and an output; where N is an integer greater than 1, each receiver channel being adapted to receive, at its input, a different portion of an original signal to be reconstituted from the various portions;

first coupling means for coupling the outputs of the N receiver channels to a merging circuit for combining the different portions of the received signals and reconstituting the originally transmitted signal;

each one of said N receiver channels including adaptive filter means coupled between the input and the output of its receiver channel and along which the signal is propagated; each adaptive filter means being adjustable to compensate for distortions in the signal received at its receiver channel input; and second coupling means for selectively coupling the output of a first one of the N receiver channels configured in a data propagating configuration to a second one of the N receiver channels configured in a channel training configuration for adjusting the adaptive filter means of said second one of said N receiver channels.

8. A receiver as claimed in claim 7, wherein the adaptive filter means of each receiver channel includes an adaptive feed-forward filter, an adaptive feedback filter, a slicer circuit, and first and second adders; each adder having two inputs and an output;

wherein the feed-forward filter is coupled at its input to the receiver channel input and at its output to an input of the first adder and the feedback filter is coupled at its input to its receiver channel output and at its output to another input of the first adder;

wherein the output of the first adder is connected to an input of the second adder and to the input of the slicer circuit; and wherein the output of the receiver channel is connected to another input of the second adder.

9. A receiver as claimed in claim 8 wherein said second coupling means for selectively coupling the output of the first one of the N receiver channels to the second one of the N receiver channels includes third coupling means for selectively coupling the output of the first one of the N receiver channels to the output of said second one of the N receiver channels.

10. A receiver as claimed in claim 8 wherein the output of each receiver channel includes a switching means for selectively coupling the channel output to one of: (a) the slicer circuit output; (b) the output of a receiver based generator producing training signals; and (c) the output of another receiver channel.

11. A receiver as claimed in claim 10, wherein N is equal to 2 and wherein the output of said first receiver channel is selectively applied to the output of the second receiver channel for training the second receiver channel.

12. A receiver as claimed in claim 10, wherein each adaptive feed-forward filter is a fractionally spaced equalizer.

13. A receiver comprising;

N receiver channels, each receiver channel having an input and an output; where N is an integer greater than 1; each receiver channel being adapted to receive, at its input, a different portion of an original signal to be reconstituted from the various portions;

means for connecting the outputs of the N receiver channels to a merging circuit for combining the different portions of the received signals and reconstituting the originally transmitted signal;

each one of said N receiver channels including adaptive filter means coupled between its input and its output; each adaptive filter means including:

(a) a feed-forward filter having an input coupled to the input of its receiver channel, and having an output coupled to an adding means;

(b) a feedback filter having an input coupled to the output of the receiver channel, and having an output coupled to the adding means;

(c) a slicer circuit having an input and an output; and (d) said adding means for supplying a first difference signal which is a function of the difference in the outputs of said feed-forward and feedback filters to the input of the slicer circuit; and each one of said N receiver channels including switching means for selectively coupling the receiver channel output to one of: (a) the output of its slicer circuit; (b) the slicer circuit output of another receiver channel; and (c) the output of a training signal generator.

14. A receiver as claimed in claim 13 wherein each one of said adaptive filter means includes:

(a) additional adder means for generating an error signal indicative of the difference between the signal at its receiver output and the first difference signal;

(b) a first multiplier for multiplying said error signal by a preselected first constant and for producing an output signal coupled to the feed-forward filter for adjusting its coefficients; and (c) a second multiplier for multiplying said error signal by a preselected second constant and for producing an output signal coupled to the feedback filter for adjusting its coefficients.

15. A receiver as claimed in claim 13, wherein the switching means of one receiver channel couples the output of its receiver channel to the output of another receiver channel for causing the output of another channel to be applied to the adaptive filter means of the one receiver channel for training the adaptive filter means of the one receiver channel.

* * * * *